United States Patent
Boyd et al.

(10) Patent No.: US 10,176,378 B1
(45) Date of Patent: Jan. 8, 2019

(54) TECHNIQUES FOR TARGET DETECTION

(71) Applicant: Amazon Technologies, Inc., Seattle, WA (US)

(72) Inventors: Scott Patrick Boyd, Seattle, WA (US); Chengwu Cui, Redmond, WA (US); Joshua John Watson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 237 days.

(21) Appl. No.: 15/248,983

(22) Filed: Aug. 26, 2016

(51) Int. Cl.
  *G06K 9/00* (2006.01)
  *G06Q 10/08* (2012.01)

(52) U.S. Cl.
  CPC ....... *G06K 9/00651* (2013.01); *G06Q 10/083* (2013.01); *G06K 2209/03* (2013.01); *G06K 2209/21* (2013.01)

(58) Field of Classification Search
  CPC ... B64C 2201/128; B64C 39/024; B64D 1/02; G06K 9/00651; G06K 7/1413; G06T 2207/10032; G06Q 10/083
  USPC ......................................................... 382/103
  See application file for complete search history.

(56) References Cited

U.S. PATENT DOCUMENTS

| | | | |
|---|---|---|---|
| 9,898,638 B2* | 2/2018 | Jones | G06K 7/1417 |
| 2017/0011333 A1* | 1/2017 | Greiner | G06Q 10/083 |
| 2017/0039510 A1* | 2/2017 | Ogilvie | B64C 39/024 |
| 2017/0132566 A1* | 5/2017 | High | B64C 39/024 |
| 2017/0220979 A1* | 8/2017 | Vaananen | G06Q 10/083 |

OTHER PUBLICATIONS

Tournier, et al. (Estimation and Control of a Quadrotor Vehicle Using Monocular Vision and Moiré Patterns), American Institute of Aeronautics and Astronautics, pp. 1-16, Aug. 24, 2006.*

* cited by examiner

*Primary Examiner* — Daniel G Mariam
(74) *Attorney, Agent, or Firm* — Kilpatrick Townsend & Stockton LLP

(57) ABSTRACT

Systems and methods are provided herein for detecting a marker (e.g., a marker that identifies a delivery location) utilizing an image captured by a camera of an unmanned aerial vehicle. A method may include obtaining marker information associated with a marker, the marker comprising a repetitive visual pattern, the marker being associated with delivery of an item by an unmanned aerial vehicle. Optical pattern information may be obtained that indicates a moiré pattern associated with the marker and the one or more cameras of the unmanned aerial vehicle. Image capture information that is associated with an image comprising the marker may be received. The marker may be detected in the image based at least in part on the image capture information and the moiré pattern associated with the marker.

20 Claims, 10 Drawing Sheets

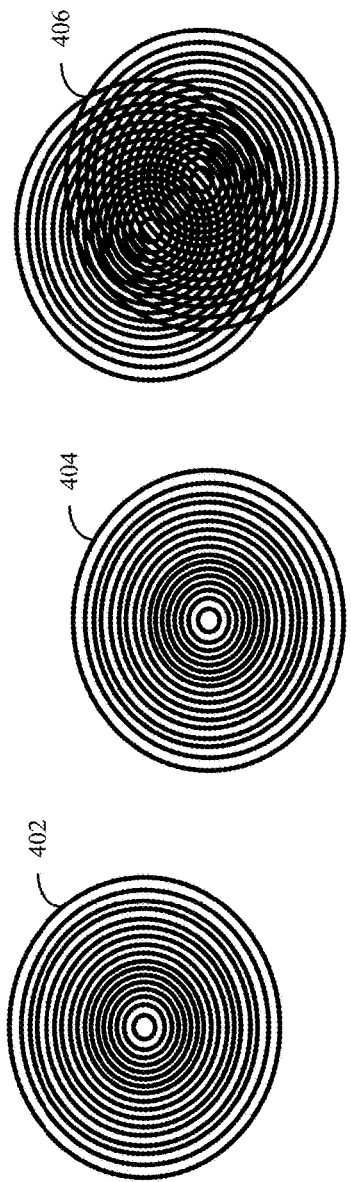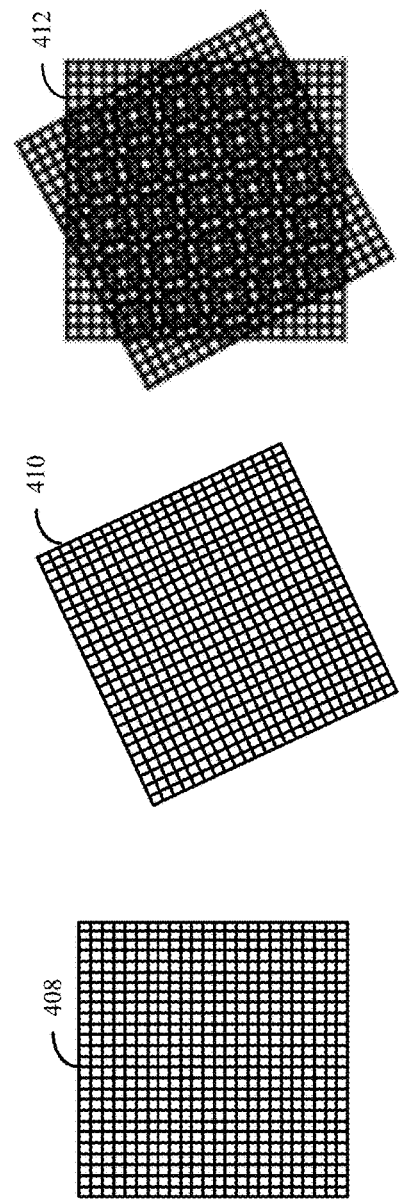

US 10,176,378 B1

TECHNIQUES FOR TARGET DETECTION

BACKGROUND

More and more users are turning to network-based resources, such as electronic marketplaces, to purchase items (e.g., goods and/or services). Typically, a user (e.g., a customer) may operate a computing device to access a network-based resource and request information about an item. The network-based resource may provide the information and information about an available delivery method. In turn, the user may purchase the item from the network-based resource and specify a delivery location. One delivery option being considered includes delivering items to the delivery location by an unmanned aerial vehicle (UAV). In the future, once the item is loaded on the UAV, the UAV may be configured to navigate to a particular area (e.g., relatively near the delivery location) in order to identify a marker using one or more cameras. Upon detection of the marker, the UAV may navigate to the marker and place the item on or near the marker to complete the delivery. Utilizing UAVs to deliver items to users of an electronic marketplace presents various challenges. For example, the UAV may generally operate at relatively high altitudes, making marker detection difficult. This is especially true in inclement weather. Poor marker detection can cause delivery failure or delay resulting in a negative impact to the electronic marketplace provider such as loss of revenue or good will.

BRIEF DESCRIPTION OF THE DRAWINGS

Various embodiments in accordance with the present disclosure will be described with reference to the drawings, in which:

FIGS. 4A and 4B are schematic diagrams illustrating additional example moiré patterns;

DETAILED DESCRIPTION

Figure 1:
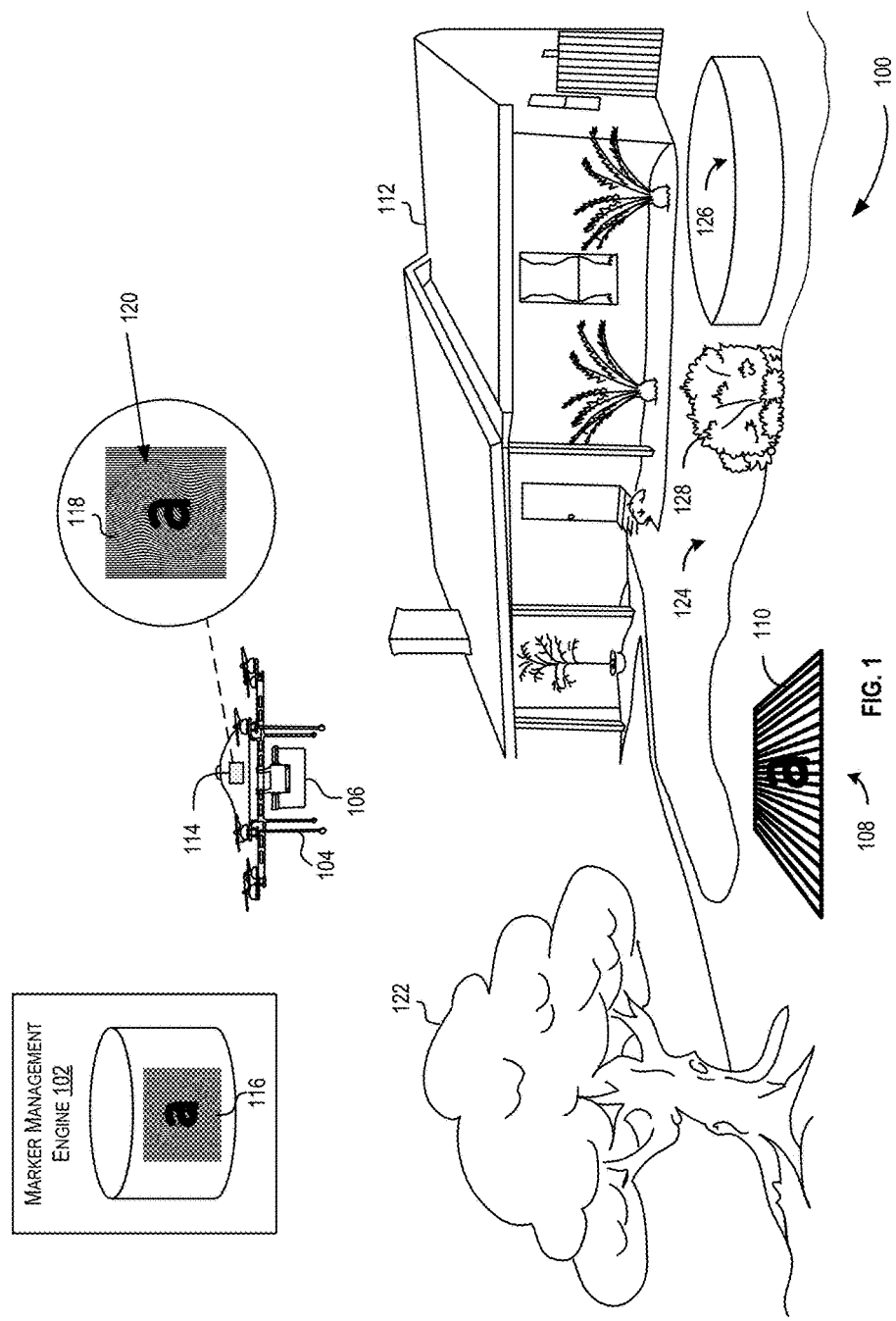
FIG. 1 illustrates an example operational environment for delivering an item by UAV utilizing a marker management engine, in accordance with at least one embodiment.

Techniques described herein are directed to marker detection utilizing a marker management engine. In at least one embodiment, a user may navigate to a website of an electronic marketplace. In some examples, the electronic marketplace may be managed by one or more service provider computers (e.g., servers) that host electronic content in the form of an electronic catalog. Users of the electronic marketplace may access the electronic catalog to view, review, discuss, order, and/or purchase items (e.g., physical items that may be stored in a warehouse or other location or electronic items that may be stored on a server and served to electronic devices) from the electronic marketplace. In some examples, the marker management engine may receive order information identifying one or more items to be delivered to the user (e.g., a gallon of milk, a book, an article of clothing, etc.). The order information may further include UAV identification information specifying a particular UAV with which the item will be delivered. The UAV may be associated with a set of attributes (e.g., an identifier, system attributes corresponding to propulsion and landing systems, camera system specifications corresponding to one or more cameras attached to the UAV, etc.). In some examples, a UAV may be assigned to the delivery (e.g., a next available UAV, a UAV that services a particular region, etc.) and attributes of the UAV (e.g., camera system specifications) may be retrieved. The user may be sent electronic marker information for the delivery that specifies a design for the marker. By way of example, the marker information may provide the user with an image (e.g., a marker including a repetitive pattern) that may be printed or otherwise displayed. In other examples, the electronic marketplace provider may provide (e.g., ship) a marker (e.g., a cloth, sheet of plastic, etc.) to the user for item delivery. In still further examples, an electronic display device (e.g., a light-emitting diode (LED) screen, a liquid crystal display (LCD), a projector, or the like) may be utilized to depict the marker information utilizing a surface (e.g., the LED screen, the LCD screen, the ground, a landing pad, etc.).

In at least one embodiment, the user may place the marker (or otherwise display the marker) at a location (e.g., the user's front yard, back yard, rooftop, driveway, shipment area, etc.) in order to mark the location at which the delivery should take place. While in flight, the UAV may detect the marker utilizing a camera attached to the UAV. In at least one example, the marker management engine may be configured to specifically detect objects in the camera image that produce a moiré pattern. A "moiré pattern," as used herein refers to a visual distortion of an image that occurs when an object in an image exceeds (e.g., by a threshold amount) a sensor resolution of the camera that is capturing the image. In some examples, a moiré pattern produces a visual distortion (e.g., wavy lines), a color distortion, a magnification of a portion of the image, an animation, or the like. Examples of such moiré patterns are discussed further below in connection with FIGS. 3A, 3B, 4A, and 4B. Upon detection, the marker management engine may instruct the UAV to navigate to the location of the detected marker in order to complete the delivery. By utilizing moiré patterns, the UAV may be configured to detect markers from greater distances than otherwise would have been possible, as moiré patterns may by visible from greater distances than other undistorted details of an image. For example, a moiré pattern may cause one or more images of a marker to be magnified and/or the contrast of the image to be altered so that a marker may be more easily detected than if the moiré pattern was not utilized. Additionally, moiré patterns may be more easily detected despite various weather conditions such as rain, sleet, hail, snow, or the like. Still further, the repetitive details of the marker design used to produce the moiré pattern, may enable the marker to be identified utilizing less than the whole marker (e.g., if portions of a marker were blocked by a tree).

In at least one example, the marker management engine may be utilized to generate various markers that are specifically designed to produce a moiré pattern. In some examples, attributes of the UAV (e.g., camera system specifications) may be utilized by the marker management engine to generate a particular marker that is optimized to produce a moiré pattern given the particular camera(s) utilized by the UAV. For example, the marker design may include details that, when viewed by a particular camera sensor produce an image that includes a moiré pattern. In some examples, the marker may be associated with a particular location (e.g., the user's home and/or office), a particular user, a particular order and/or item, or the like.

In at least one embodiment, the marker management engine may generate one or more filter images that, when superimposed over a specially designed marker, produce a moiré pattern. These filter images may be unique to a user, a delivery location, an order and/or item, or the like. The marker management engine may utilize a filter image to detect a marker by superimposing the filter image over a still image or live video feed captured by a camera system of the UAV, for example. In at least one example, the marker management engine may store a moiré pattern. While the UAV is in flight (e.g., travelling horizontally, hovering above the ground, etc.) the marker management engine may analyze the image(s) captured by the UAV's camera(s) and superimpose the filter image over the captured image(s). When the marker management engine identifying a moiré pattern that matches the stored moiré pattern associated with the user, the marker management engine may instruct the UAV to navigate toward the marker (e.g., for delivery).

In accordance with at least one embodiment, the marker management engine may additionally, or alternatively, utilize local tone mapping techniques to detect the location of a marker. "Local tone mapping," may include image processing techniques that may be used to map one set of colors of a first range to a second set of colors of a second range. Accordingly, local tone mapping techniques maybe used to adjust the exposure corresponding to various portions of an image. In some cases, utilizing tone mapping techniques may maximum the contrast of an image and/or may result in emphasizing as many image details as possible. Local tone mapping may utilize a non-linear function to change at least some of the pixels of an image according to features extracted from surrounding pixels. In other words, the effect of the algorithm changes in each pixel according to local features of the image. By way of example, the marker management engine may analyze an image (e.g., an aerial picture of a yard) to identify portions of the image that are overexposed (e.g., bright) or underexposed (e.g., dark). Utilizing local tone mapping techniques, various pixels relatively near an overexposed portion of the image may be analyzed. The pixels of the overexposed region may be remapped according to a local tone mapping algorithm to map the overexposed pixel values to a different range. Accordingly, the overexposed portion may be darkened by the mapping such that the details within the overexposed portion of the image may be more visible. Similarly, an underexposed portion of an image may be analyzed and the pixels relatively near the underexposed portion may be utilized to map the pixels within the underexposed portion to different pixel values. In this example, the underexposed portion of the image may be brightened to allow for details within the underexposed portion of the image to become more visible. Accordingly, a marker that is placed in a location that falls in the shadow of a tree or building, may be more easily detected as the shadowed portion of an image can be brightened to allow for greater visibility. It should be appreciated that the local tone mapping techniques discussed herein may be used separately from, or in combination with, the moiré pattern detection techniques discussed herein.

In some examples, the marker management engine may utilize images from multiple cameras from which to draw portions of the image that provide the best exposure. In other words, the marker management engine may select a portion of an image because the portion provides a highest number of visible details as compared to other images taken by other cameras of the UAV. Once portions are selected that provide the best exposure, the selected portions may be combined to produce a new image or used to replace one or more sub-optimal (e.g., underexposed, overexposed) portions of a pre-existing image. Utilizing such techniques enables the marker management engine to optimize the exposure of an image, making detection of the marker more likely.

The techniques disclosed herein provide, at least, an efficient method of detecting a marker from one or more images. By utilizing the techniques included herein, the marker may be more easily identified from further distances than detection could have occurred otherwise and/or despite weather conditions (e.g., snow, rain, hail, etc.) that otherwise might make marker detection impossible or difficult. The techniques described above and below may be implemented in a number of ways and in a number of contexts. Several example implementations and contexts are provided with reference to the following figures, as described below in more detail. However, the following implementations and contexts are but a few of many.

FIG. 1 illustrates an example operational environment 100 for delivering an item by UAV utilizing a marker management engine 102, in accordance with at least one embodiment. These techniques are described in more detail below in connection with at least FIGS. 2-10. In the illustrated environment of FIG. 1, the UAV 104 may carry a package 106 for delivery to a location 108 identified by marker 110. The UAV 104 may be deployed to the location 108 associated with a user to deliver the package 106. In the example operational environment 100, the location 108 may be relatively near a dwelling 112 of the user. However, the embodiments described herein are not limited as such and may similarly apply to other types of locations and/or other associations to the user. The UAV 104 may rely on image data from camera system 114 to detect the marker 110 and deliver the package to the location 108. The camera system 114 may include one or more cameras affixed to a suitable portion of the UAV 104.

In accordance with at least one embodiment, the user may have operated a computing device to access a network-based resource to order one or more items (e.g., a gallon of milk, a book, a video game, etc.). As part of the ordering process, or at another suitable time, the marker management engine 102 may generate marker information (e.g., a size, one or more colors, one or more moiré patterns, etc.) corresponding to the marker 110. By way of example, the marker 110 may include one or more lines that are repetitive in nature. In some examples, the marker 110 may include text (e.g., alphanumeric characters, the user's name, the address, coordinates, etc.), one or more images (e.g., a silhouette of an animal, an image associated with the user such as a family portrait, etc.), or any suitable detail. In at least one example, the marker 110 may contain a series of lines such as those depicted in FIG. 1. The marker 110 may be specifically generated such that the marker 110, when viewed using the camera system 114, will produce a moiré pattern that matches stored marker information 116 associated with the user, the order, the item, or the location. Upon generating the marker information, the marker management engine 102 may store the marker information as stored marker information 116 associated with the user, the item, the order, the location 108, or the like. In the example depicted in FIG. 1, the marker management engine 102 may cause the stored marker information 116 to be associated with the location 108. The association, in some examples, may be stored in a user profile of the user. The marker management engine 102 may cause the stored marker information 116 to be electronically provided to the user (e.g., provide a marker for printout and/or display) so that the user may display the marker 110 at the location 108. Alternatively, the marker management engine 102 may execute instructions that cause a physical marker (e.g., a 36-inch by 36-inch sheet of plastic) to be created and shipped to the user. As part of the delivery process, the item(s) may be packaged at a facility and loaded on the UAV 104 as depicted. The UAV 104 may be remotely controlled or autonomously operated to fly the package 106 from the facility to an area that is relatively near the location 108 (e.g., 2 miles, 5 miles, 400 feet, etc.).

Upon determining that the UAV is within the area near the location 108, the marker management engine 102 (e.g., operating as a software module of the UAV or as a software module of a centralized server) may obtain the stored marker information 116. One or more images (e.g., still images and/or video) may be received, or otherwise obtained, by the marker management engine 102. By way of example, the image 118 (e.g., as depicted or as part of a larger image) may be received by the marker management engine 102 from the camera system 114 of the UAV. It should be appreciated that, in this example, the marker 110, the stored marker information 116, and the image 118 are each intended to depict a same marker.

In accordance with at least one embodiment, the marker management engine 102 may analyze the image 118 in order to identify moiré pattern 120. The image 118 is merely an example and it should be appreciated that the image 118 may include more details than those depicted in FIG. 1. For example, the image 118 may be an aerial view of the user's property including some portions of the dwelling 112, a tree 122, a front yard 124, a kiddie pool 126, a bush 128, or the like, as depicted later in FIG. 5. An image including the details depicted in FIG. 1 may be analyzed by the marker management engine 102 in order to identify portions of the image that depict a moiré pattern. By way of example, the marker management engine 102 may analyze the aerial image 502 depicted in FIG. 5 to determine that the tree 122, the front yard 124, the kiddie pool 126, the bush 128, and other portions of the image do not contain moiré patterns. Similarly, the marker management engine 102 may analyze the image to determine that a portion (e.g., the portion depicting the marker 110) does include a moiré pattern. In some examples, the marker management engine 102 may crop the image to produce the image 118. In other examples, the marker management engine 102 may merely ignore details in the aerial image that do not depict a moiré pattern.

Upon identifying that the image 118 includes a moiré pattern, the marker management engine 102 may compare the image 118 to the stored marker information 116. The comparison may result in the marker management engine 102 determining that the image 118 does not match the stored marker information 116 within some confidence threshold (e.g., 90% or more certain, 55% or more certain, 75%-80% certain, etc.). In this case, the marker management engine 102 may continue to analyze additional images captured by the UAV. In some cases, the marker management engine 102 may cause the UAV to travel to a different location in order to continue searching for the marker 110.

In at least on embodiment, the marker management engine 102 may determine, through the comparison of the image 118 to the stored marker information 116, that the image 118 matches (e.g., is similar within a confidence threshold of, for example, 85% or greater, etc.) the stored marker information 116. In such cases, the marker management engine 102 may cause the UAV to navigate to the location 108 in order to deliver the package 106.

Figure 2:
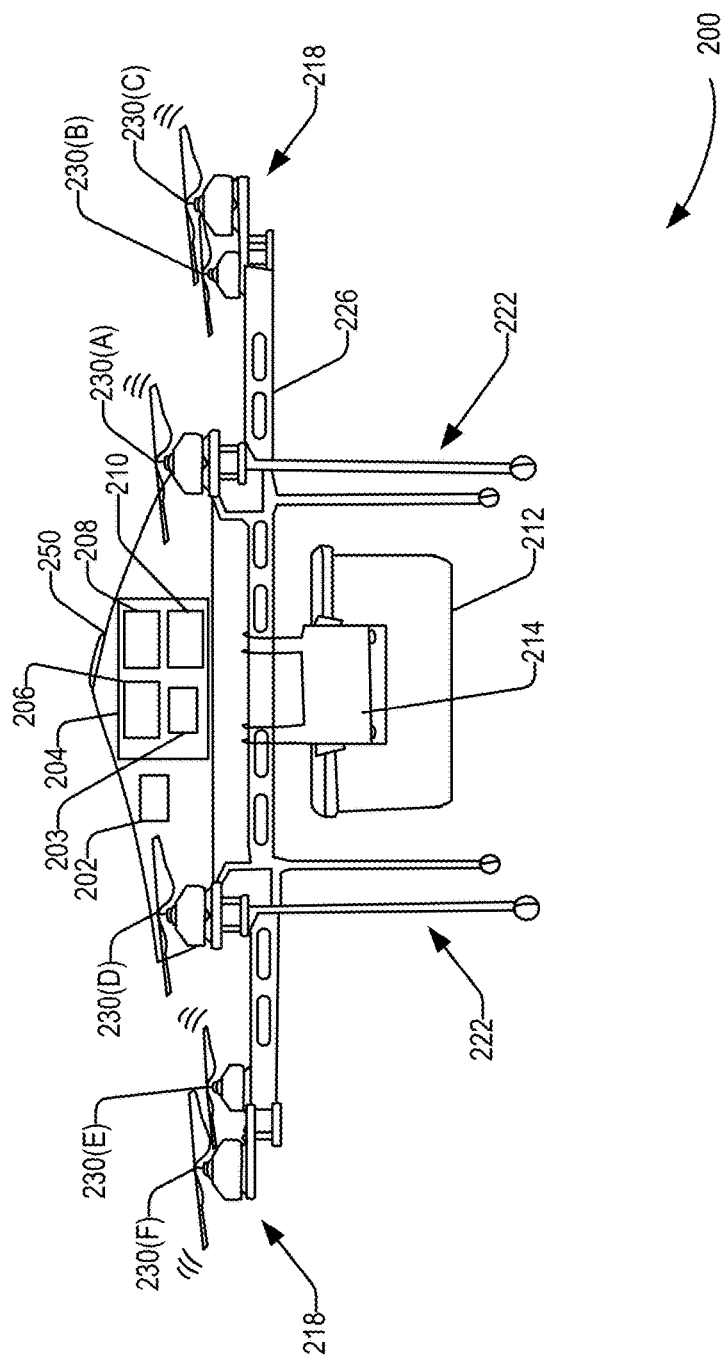
FIG. 2 illustrates an example unmanned aerial vehicle configured to deliver an item utilizing a marker management engine, in accordance with at least one embodiment.

FIG. 2 illustrates an example unmanned aerial vehicle 200 configured to detect a marker utilizing a marker management engine (e.g., the marker management engine 102 of FIG. 1), in accordance with at least one embodiment. In FIG. 2, an example UAV 200 configured to deliver an item (and/or pickup an item) is illustrated. The UAV 200 may be designed in accordance with commercial aviation standards and may include multiple redundancies to ensure reliability. In particular, the UAV 200 may include a plurality of systems or subsystems operating under the control of, or at least partly under the control of, a management component 202.

The management component 202 may be configured to mechanically and/or electronically manage and/or control various operations of other components of the UAV 200. For example, the management component 202 may include various sensing, activating, and monitoring mechanisms to manage and control the various operations. For instance, the management component 202 may include or interface with an onboard computing system 204 hosting a management module for autonomously or semi-autonomously controlling and managing various operations of the UAV 200 and, in some examples, for enabling remote control by a pilot. The various operations may also include managing other components of the UAV 200, such as a camera system 203, a propulsion system 218 to facilitate flights, a payload holding mechanism 212 to facilitate holding a payload (e.g., a package), and/or a payload releasing mechanism 214 to facilitate release and delivery of the payload. In at least one embodiment, the management component 202 provides the functionality described above in connection with the marker management engine 102 of FIG. 1.

Portions of the management component 202, including mechanical and/or electronic control mechanisms may be housed under the top cover 250 or distributed within other components such as the payload holding mechanism 212 and the payload releasing mechanism 214. In a further example, components remote from the UAV 200 may be deployed and may be in communication with the management component 202 to direct some or all of the operations of the management component 202. These remote components may also be referred to as a management component.

In an example, the management component 202 may include a power supply and assemblies (e.g., rechargeable battery, liquid fuel, and other power supplies) (not shown), one or more communications links and antennas (e.g., modem, radio, network, cellular, satellite, and other links for receiving and/or transmitting information) (not shown), one or more navigation devices and antennas (e.g., global positioning system (GPS), inertial navigation system (INS), range finder, Radio Detection And Ranging (RADAR), and other systems to aid in navigating the UAV 200 and detecting objects) (not shown), and radio-frequency identification (RFID) capability (not shown).

The UAV 200 may also include the onboard computing system 204. In an example, the onboard computing system 204 may be integrated with the management component 202. In another example, the onboard computing system 204 may be separate from but may interface with the management component 202. The onboard computing system 204 may be configured to provide an electronic control of various operations of the UAV 200, including the ones provided by the marker management engine 102 of FIG. 1. In an example, the onboard computing system 204 may also process sensed data by one or more other components of the UAV, such as the camera system 203. In a further example, the onboard computing system 204 may also electronically control components of the payload holding mechanism 212 and/or the payload releasing mechanism 214. In another example, the onboard computing system 204 may also electronically control components of the UAV 200 such as a plurality of propulsion devices, a few of which, 230(A)-230(F) are included in FIG. 2.

As illustrated in FIG. 2, the onboard computing system 204 may be housed within the top cover 250 and may include a number of components, such as a computer 206, a storage device 208, the camera system 203, and an interface 210. The computer 206 may host the management module configured to provide management operations of the flight and/or other portions of a mission (e.g., a delivery of an item, pick-up of an item, marker detection, etc.) of the UAV 200. For example, the data management module may analyze one or more images captured by the camera system 203, determine an appropriate delivery surface, determine a distance by which to lower a payload, a speed of lowering the payload, direct the propulsion system to position the UAV 200 according to this data, activate a release of a package from the payload holding mechanism 212, activate a release of a cable, and/or activate other functions of the mission.

In some embodiments, the management component 202 may perform any suitable operations discussed in connection with the marker management engine 102 of FIG. 1. For example, the management component 202 may receive order information associated with a request for delivery and/or pickup of an item. The management component 202 may determine and/or assign a particular UAV that will be utilized for delivery/pick-up of the item. The management component 202 may generate and/or obtain marker information associated with the marker that will be utilized for delivery of the item. The management component 202 may perform various operations to compare an image captured by the camera system 203 to stored marker information (e.g., stored in storage device 208). The management component 202 may, upon determining that a portion of an image captured by the camera system 203 matches (e.g., within a threshold value) stored marker information, may execute instructions that navigate the UAV to a particular location (e.g., to land at/near the identified marker). In at least one example, the management component 202 may interact with the storage device 208. The storage device 208 may represent one or more storage media, such as a volatile or non-volatile semiconductor, magnetic, or optical storage media.

In an example, the storage device 208 may be configured to store any operational data of the UAV 200, marker information associated with the marker to be used for delivery/pick-up, generated or received data associated with the delivery surface, and/or received camera data (e.g., one or more still images, a video feed, etc.). The operational data may include the distance by which the payload may be lowered and the lowering speed. The marker information may indicate a moiré pattern for the marker when viewed by the camera system 203. The marker information may additionally, or alternatively include one or more filters to be utilized during image analysis. In addition, the storage device 208 may store a set of rules associated with lowering and releasing the payload. This set of rules may specify parameters to determine, where, when, and/or how to deliver the payload such that a likelihood of damaging the payload (or content thereof) and/or interference with the UAV 200 may be reduced.

The interface 210 may represent an interface for exchanging data as part of managing and/or controlling some of the operations of the UAV 200. In an example, the interface 210 may be configured to facilitate data exchanges with the management component 202, other components of the UAV 200, and/or other components remote from the UAV 200. As such, the interface 210 may include high speed interfaces, wired and/or wireless, serial and/or parallel, to enable fast upload and download of data to and from the onboard computing system 204.

As shown in FIG. 2, The camera system 203 may be positioned on top cover 250 or on the frame 226 of UAV 200. Although not shown, one or more camera systems (e.g., the camera system 203) may be mounted in different directions (e.g., downward looking cameras to identify ground objects and/or a landing zone for a payload while UAV 200 is in flight.

As shown in FIG. 2, the UAV 200 may also include the payload holding mechanism 212. The payload holding mechanism 212 may be configured to hold or retain a payload. In some examples, the payload holding mechanism 212 may hold or retain the payload using friction, vacuum suction, opposing arms, magnets, holding, and/or other retaining mechanisms.

As illustrated in FIG. 2, the payload holding mechanism 212 may include a compartment configured to contain the payload. In another example, the payload holding mechanism 212 may include two opposing arms configured to apply friction to the payload. The management component 202 may be configured to control at least a portion of the payload holding mechanism 212. For example, the management component 202 may electronically and/or mechanically activate the payload holding mechanism 212 to hold and/or release the payload. In an example, the payload may be released from the payload holding mechanism 212 by opening the compartment, pushing the payload, moving one or both of the opposing arms, and/or stopping an application of friction, vacuum suction, and/or magnetic force.

The UAV 200 may also include the payload releasing mechanism 214. In an example, the payload releasing mechanism 214 may be integrated with the payload holding mechanism 212. In another example, the payload releasing mechanism may be separate from the payload holding mechanism 212. In both examples, the payload releasing mechanism 214 may be configured to lower, using a cable, a payload released from the payload holding mechanism 212 and to release the cable once the payload is lowered by a distance.

As such, the payload releasing mechanism 214 may include a lowering mechanism and a release mechanism. For example, the lowering mechanism may include a cable and/or an electronic or mechanical control configured to lower the cable at a controlled speed. For example, this control may include a winch, a spool, a ratchet, and/or a clamp. The cable may couple the payload with the UAV 200. For example, one end of the cable may be connected, attached, or integral to the payload. Another end of the cable may be coupled to one or more components of the payload releasing mechanism 214, the payload holding mechanism 212, the frame of the UAV 200, and/or other component(s) of the UAV 200. For example, the cable may be coiled around the winch or spool or may be stowed or coiled inside the compartment (if one is used as part of the payload holding mechanism 212). The cable may have a configuration selected based on the mission of the UAV 200, the mass of the payload, and/or an expected environment associated with the delivery location (e.g., the potential interference).

In an example, the release mechanism may be integrated with the lowering mechanism. In another example, the release mechanism may be separate from the lowering mechanism. In both examples, the release mechanism may be configured to release the cable when the payload may have been lowered by a certain distance. Releasing the cable may include severing the cable, weakening the cable, and/or decoupling the cable from the UAV 200 (e.g. from the payload releasing mechanism 214) without severing or weakening the cable.

To sever the cable, the release mechanism may include a sharp surface, such as a blade to, for example, cut the cable when applied thereto. To weaken the cable, the release mechanism may include a sharp head, edge, and/or point, such as a hole puncher, or a friction surface to cause a damage to the integrity of the structure of the cable. Other release mechanisms may also be used to sever or weaken the cable. An example may include a mechanism configured to apply a thermoelectric effect to the cable. For instance, a contact surface, such as one using an electrical conductor, may be configured to release heat upon application of a voltage. The contact surface may come in contact with the cable or may be integrated within different sections of the cable. Upon application of the voltage, the contact surface may sever or weaken the cable by applying heat to the cable. To decouple the cable from the UAV 200, the cable may be in the first place insecurely coupled to the UAV 200 such that, upon an unwinding of the cable, the cable may become detached from the UAV 200. For example, the cable may be coiled around the winch or spool without having any of the cable ends attached to the winch or spool or to another component of the UAV 200. In another example, the cable may be coupled to a component of the UAV 200 through a weak link such that upon a tension generated based on the mass of the payload, the link may be broken to free the cable from the UAV 200.

The release mechanism may be electronically or mechanically controlled. This control may be effected based on, for example, the distance by which the payload may have been lowered and/or based on an amount of a tension of the cable, an increase in the amount, a decrease in the amount, or a sudden or fast change in the amount. Various configurations may be used to measure the distance, the amount of tension, and the change in the amount. For example, the distance may be determined from the number of rotations of a winch or spool if one is used or based on a distance or cable length sensor. The amount of the tension and the change in the amount may be determined based on spring-based or electronic-based sensors.

Further, the release mechanism may be electronically activated based on a signal generated in response to detecting that the distance may have been traveled and/or the amount or change in the amount of tension. In another example, the release mechanism may be activated based on a mechanical configuration. For example, as the cable may be lowered, a ratchet may load a spring that may be coupled to release mechanism. Upon the load exceeding a threshold, the spring may be released, thereby activating the release mechanism. In another example, a tension of the cable may be used to hold the release mechanism away from the cable. As soon as the tension changes (e.g., the cable becomes loose indicating that the payload may be resting on the ground), the release mechanism may be activated to sever or weaken the cable.

Further, the UAV 200 may include a propulsion system 218. In some examples, the propulsion system 218 may include rotary blades or otherwise be a propeller-based system. As illustrated in FIG. 2, the propulsion system 218 may include a plurality of propulsion devices, a few of which, 230(A)-230(F), are shown in this view. Each propeller device may include one propeller, a motor, wiring, a balance system, a control mechanism, and other features to enable flight. In some examples, the propulsion system 218 may operate at least partially under the control of the management component 202. In some examples, the propulsion system 218 may be configured to adjust itself without receiving instructions from the management component 202. Thus, the propulsion system 218 may operate semi-autonomously or autonomously.

The UAV 200 may also include landing structure 222. The landing structure 222 may be adequately rigid to support the UAV 200 and the payload. The landing structure 222 may include a plurality of elongated legs which may enable the UAV 200 to land on and take off from a variety of different surfaces. The plurality of systems, subsystems, and structures of the UAV 200 may be connected via frame 226. The frame 226 may be constructed of a rigid material and be capable of receiving via different connections the variety of systems, sub-systems, and structures. For example, the landing structure 222 may be disposed below the frame 226 and, in some examples, may be formed from the same material and/or same piece of material as the frame 226. The propulsion system 218 may be disposed radially around a perimeter of the frame 226 or otherwise distributed around the frame 226. In some examples, the frame 226 may attach or be associated with one or more fixed wings.

Hence, a UAV, similar to the UAV 200, may be deployed on a mission to, for example, deliver and/or retrieve a payload (e.g., an item). The UAV may autonomously or semi-autonomously complete or perform a portion of the mission. For example, coordinates of a delivery location may be provided to the UAV (e.g., as part of a process of ordering an item from an electronic marketplace provider). The UAV may hold the payload in a payload holding mechanism and fly to the delivery location. Utilizing the camera system 203, the UAV may capture one or more images (e.g., still and/or video) to detect a marker. Upon detection of the marker, the UAV may navigate to the delivery location identified by the marker. Upon arrival (e.g., landing) at the location, the UAV may release the payload from the payload holding mechanism.

Figure 3A:
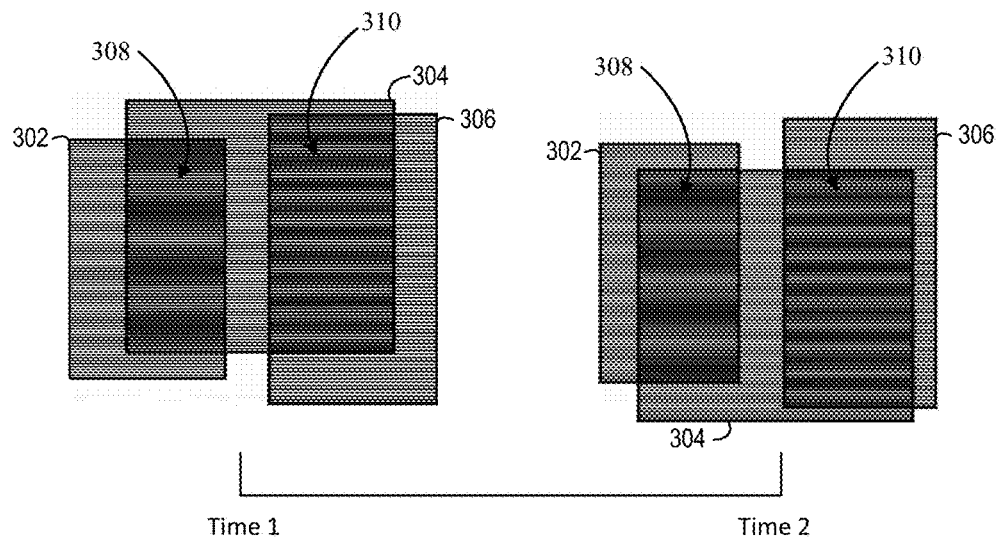
FIGS. 3A and 3B are schematic diagrams illustrating example moiré patterns.
Figure 3B:
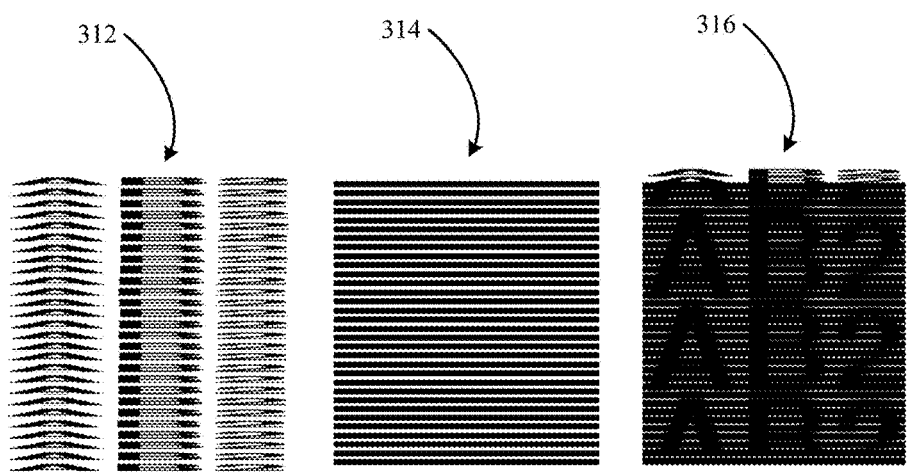

FIGS. 3A and 3B are schematic diagrams illustrating an example moiré patterns. For example, FIG. 3A depicted a moiré pattern created by image 302, image 304, and image 306. Each image contains slightly different line widths with respect to the other images. A moiré pattern may be created by superimposing the image 304 over the image 302 and the image 306 as depicted in FIG. 3. The size of the moiré pattern as well as its direction of movement may depend on the relative size of the intersecting patterns. For example, at time 1, the image 304 may begin to move downward to the position indicated at time 2. As the image 304 is moved downward, a moiré pattern 308 may be created. The moiré pattern 308 may appear as if the bold lines are moving in the opposite direction (upward) as the image 304. At the same time, superimposing the image 304 may produce a moiré pattern 310. As the image 304 is moved downward, the moiré pattern 310 may appear as if the bold lines are moving in the same direction (downward) as the image 304. Similarly, if the image 304 was moved in the reverse direction (e.g., from the position indicated at time 2 to the position indicated at time 1), the moiré pattern 308 may appear as if the bold lines are moving downward, while at the same time the moiré pattern 310 may appear as if the bold lines are moving upward.

In at least one embodiment, similar line patterns may be utilized by the marker management engine 102 of FIG. 1 to produce a moiré pattern with respect to a marker. For example, marker information may be generated that specifies a number, width, and/or orientation (e.g., vertical, horizontal, or a combination of both) of lines to be included in a marker. While attempting to detect a moiré pattern such as the ones depicted in FIGS. 3A and 3B, the marker management engine 102 may superimpose a filter image similar to the image 304 to images captured by a UAV (e.g., the UAV of FIG. 2). Upon superimposing the filter image, the marker management engine 102 may analyze the resulting effect to determine if any portion of the captured images produce a moiré pattern such as the moiré pattern 308 or the moiré pattern 310. For example, the moiré pattern 308 may be stored (e.g., in a record associated with the user, the item, the order, the location, or the like). Upon detecting a moiré pattern produced from the superimposed image, the marker management engine 102 may determine if the produced moiré pattern matches the moiré pattern 308 associated with the location. If the moiré patterns match (e.g., within a threshold value such as a confidence level, a score, etc.), the marker management engine 102 may determine that the correct marker has been detected and may perform one or more remedial actions such as instructing the UAV (or causing the UAV to be instructed) to approach the location of the detected marker. If the moiré patterns do not match, the marker management engine 102 may determine that the correct marker has not been detected and may perform one or more remedial actions such as instructing the UAV (or causing the UAV to be instructed) to proceed with procedures for searching for a marker (e.g., continue executing a search pattern, conduct a new search pattern, continue capturing images, etc.).

FIG. 3B depicts another example moiré pattern produced by a base image 312 and a revealing image 314. The moiré pattern 316 depicted in FIG. 3B is an example of a "shape moiré pattern" that demonstrates moiré magnification. In the example of FIG. 3B, the base image 312 includes a number of shapes (e.g., "A," "B", "C") that is compressed along a vertical access. The revealing image 314 includes a number of horizontal lines. When the revealing image 314 is superimposed over the base image 312, the shapes of the base image 312 may appear magnified as depicted by the moiré pattern 316. In at least one example, as the revealing image 314 is moved, the magnified shapes of the moiré pattern 316 may appear to move in the reverse direction. The moiré pattern may be created due to the period of the shapes in the base image 312 being within a threshold range of the period of lines in the revealing image 314.

In at least one embodiment, a similar moiré pattern may be utilized by the marker management engine 102 of FIG. 1 to detect a marker. For example, the marker management engine 102 may generate marker information that specifies the orientation of the shapes as included in the base image 312. While attempting to detect the moiré pattern 316, the marker management engine 102 may superimpose the revealing image 314 over images captured by a UAV. The marker management engine 102 may then analyze the resulting images to determine if any portion of those images produce a moiré pattern such as the moiré pattern 316. As a non-limiting example, the moiré pattern 316 may be stored (e.g., in a record associated with the user, the item, the order, the location, or the like). Upon detecting the moiré pattern 316, the marker management engine 102 may determine if the moiré pattern 316 matches the stored moiré pattern associated with the location. As described above, if the moiré patterns match, the marker management engine 102 may determine that the correct marker has been detected and may perform one or more remedial actions such as instructing the UAV (or causing the UAV to be instructed) to approach the location of the detected marker. If the moiré patterns do not match, the marker management engine 102 may determine that the correct marker has not been detected and may perform one or more remedial actions such as instructing the UAV (or causing the UAV to be instructed) to proceed with procedures for searching for a marker (e.g., continue executing a search pattern, conduct a new search pattern, continue capturing images, etc.).

FIGS. 4A and 4B are schematic diagrams illustrating additional example moiré patterns (e.g. a moiré pattern 406 and a moiré pattern 412, respectively). FIG. 4A depicts a marker image 402 and a marker filter image 404. The marker management engine 102 of FIG. 1 may utilize the marker image 402 (e.g., collected by the UAV 200 of FIG. 2) and the marker filter image 404 (e.g., a stored filter image) to detect the existence of a particular marker. For example, an image including the marker image 402 may be received, or otherwise obtained by the marker management engine 102. The marker management engine 102 may superimpose the marker filter image 404 over the marker image 402. The resulting effect may include a moiré pattern 406. The marker management engine 102 may compare the moiré pattern 406 to a stored moiré pattern. In at least one example, the mere existence of the moiré pattern 406 may be indicative of correct marker detection which may obviate the need to compare the moiré pattern to a stored moiré pattern. Upon detecting the moiré pattern 406, and/or comparing the moiré pattern 406 to the stored moiré pattern, the marker management engine 102 may determine that the correct marker (e.g., the marker being searched for) has been identified in the received/obtained image and may perform one or more remedial actions. Such remedial actions include instructing the UAV (or causing the UAV to be instructed) to approach the location of the detected marker. If the moiré pattern 406 does not appear, the marker management engine 102 may determine that the correct marker has not been detected and may perform one or more remedial actions. Such remedial actions include instructing the UAV (or causing the UAV to be instructed) to proceed with procedures for searching for a marker (e.g., continue executing a search pattern, conduct a new search pattern, continue capturing images, etc.).

FIG. 4B depicts a marker image 408 and a marker filter image 410. In a similar manner as described above, the marker management engine 102 of FIG. 1 may utilize the marker image 408 (e.g., collected by the UAV 200 of FIG. 2) and the marker filter image 410 to detect the existence of a particular marker. For example, an image including the marker image 408 may be received, or otherwise obtained by the marker management engine 102. The marker management engine 102 may superimpose the marker filter image 410 over the marker image 408 (or otherwise combine the images). The resulting effect may include a moiré pattern 412. The marker management engine 102 may detect the moiré pattern 412 and compare it to a stored moiré pattern. In some cases, the mere existence of the moiré pattern 412 may be indicative that the correct marker has been detected. Upon detecting the moiré pattern 412, the marker management engine 102 may determine that the correct marker (e.g., the marker being searched for) has been identified in the received/obtained image and may perform one or more remedial actions such as instructing the UAV (or causing the UAV to be instructed) to approach the location of the detected marker. If the moiré pattern 412 does not appear, the marker management engine 102 may determine that the correct marker has not been detected and may perform one or more remedial actions such as instructing the UAV (or causing the UAV to be instructed) to proceed with procedures for searching for a marker (e.g., continue executing a search pattern, conduct a new search pattern, continue capturing images, etc.).

Figure 5:
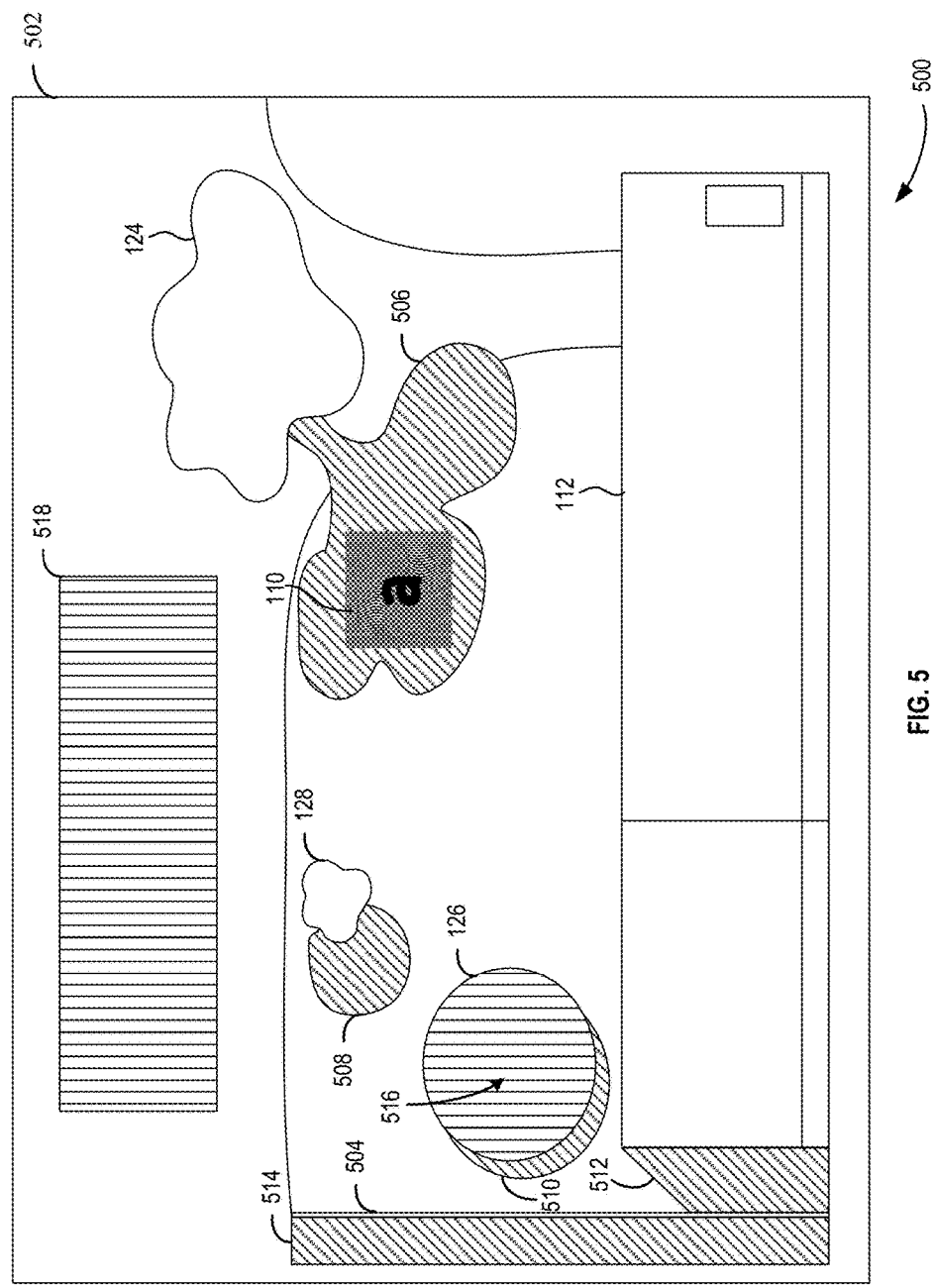
FIG. 5 illustrates an example operational environment for detecting a marker utilizing local tone mapping techniques, in accordance with at least one embodiment.

FIG. 5 illustrates an example operational environment 500 for detecting a marker utilizing local tone mapping techniques, in accordance with at least one embodiment. Contextually, there may be some situations that a dynamic range of an image may be outside of the capability of a camera system (e.g., the camera system 203 of FIG. 2). For example, a marker may be made of highly reflective materials, a portion of the image may contain a reflective surface (e.g., a water puddle), or the like. In some cases, an image captured by a UAV camera system may inadvertently overexpose a portion of the image (e.g., a portion containing the marker 110). In at least one example, the camera system may underexpose other portions of the image, such as areas that are darker due to shadows of other objects, for example. In either case, local tone mapping techniques may be employed by the marker management engine 102 in order to provide an optimal contrast of the image.

For example, consider the aerial image 502 depicted in FIG. 5. For purposes of explanation, the aerial image 502 depicts the operational environment 100 of FIG. 1 as viewed from above. Within the aerial image 502 the dwelling 112, the tree 122, the kiddie pool 126, the bush 128, and a fence 504 can be seen. Shadow area 506 may result from a shadow cast by the tree 122. Shadow area 508 may be cast by the bush 128. Shadow area 510 may be cast by the kiddie pool 126. Shadow area 512 may be cast by the dwelling 112. Shadow area 514 may be cast by the fence 504. Additionally, reflective surface 516 may be depicted in FIG. 5 resulting from, for example, sun light reflecting off of water contained in the kiddie pool 126. Similarly, a reflective surface 518 is depicted resulting from, for example, a patch of water on a roadway. As a non-limiting example, the marker 110 may be located as depicted in FIG. 5 within the shadow area 506.

In accordance with at least one embodiment, multiple cameras of a camera system (e.g., the camera system 203 of FIG. 2) operating as part of a UAV (e.g., the UAV 200 of FIG. 2) may be utilized for marker detection. In at least one example, the marker management engine 102 of FIG. 1 may utilize such cameras to detect a marker within the aerial image 502. By way of example, each camera may be configured to capture images utilizing different camera settings. For example, camera A may capture an image using an exposure E1 while camera B may capture an image using an exposure E1-n, where n is a multiplier. "Exposure," in this context, is determined by three camera settings: aperture, ISO, and shutter speed. "Aperture" refers to an opening of a lens's diaphragm through which light passes. "ISO" refers to the level of sensitivity of the camera sensor to available light. "Shutter speed," refers to a length of time that a camera shutter is open to expose light to the camera sensor.

In at least one embodiment, camera A may be configured to utilize exposure E1 in order to capture the aerial image 502. Based on the exposure E1, the image captured by camera A may generally depict more details than the image captured by camera B with respect to the areas illustrated by the reflective surface 516 and the reflective surface 518 of FIG. 5. Based on the exposure E1×n, the image captured by camera B may generally depict more details than the image captured by camera A with respect to the shadow areas depicted in FIG. 5. In at least one embodiment, the images captured by camera A and camera B may be combined for marker searching purposes.

By way of example, the marker management engine 102 may generate a histogram of each image to identify areas of underexposure and overexposure (e.g., the areas illustrated by the reflective surface and the shadow areas of FIG. 5). As a non-limiting example, the marker management engine 102 may analyze the image captured by camera A to determine that the shadow area 506 is underexposed, that is, that the details within the shadow area 506 are distorted or difficult to make out due to that portion of the image being too dark. The marker management engine 102 may analyze the image captured by camera B with respect to the shadow area 506. In at least one example, the marker management engine 102 may determine that the shadow area 506 includes more details (e.g., is not underexposed, is brighter, etc.) in the image captured by camera B than in the image captured by camera A. In some examples, the marker management engine 102 may utilize a portion of the image captured by camera B (e.g., the shadow area 506) to replace the same area of the image captured by camera A. Similarly, the marker management engine 102 may determine that image captured by camera A of the area illustrated by the reflective surface 516 includes more details (e.g., is not overexposed) with respect to the same area as captured by camera B. Accordingly, the marker management engine 102 may utilize the portion of the image capture by camera A to depict the area illustrated by the reflective surface 516. Each portion of the images that are overexposed/underexposed, as specified by the histogram, may be identified and the marker management engine 102 may determine which camera provides the best exposure (e.g., which image depicts the most detail) for a given portion of the image. In some examples, the marker management engine may generate a new image that includes some portions of the images captured by camera A and camera B. In the example depicted in FIG. 5, the marker 110 is located within the shadow area 506. By utilizing the images produced by the different settings corresponding to camera A and camera B, the marker management engine 102 may adjust the exposure of the shadow area 506 (as well as the remaining shadow areas and reflective surfaces depicted) in the aerial image 502 so that the image, as a whole, is provided at an optimal exposure, making the marker 110 easier to identify.

In accordance with at least one embodiment, the marker 110 may include reflective material in either/or the pattern (e.g., the lines) of the marker 110 or the background (e.g., the spaces) of the marker 110. The marker management engine 102 may analyze the marker information for the marker 110 to determine that the marker 110 includes at least one reflective portion. In at least one example, such marker information may be utilized by the marker management engine 102 as a tool for detecting the marker 110 in an image captured by camera A and/or camera B. For example, the marker management engine 102 may execute instructions that identify one or more overexposed portions of the image. In at least one example, the area defined by the marker 110 may be identified as an overexposed portion of the image. Once identified, the marker management engine 102 may utilize one or more local tone mapping algorithms to adjust the exposure of the image (e.g., to be similar to pixel values of relatively nearby pixels). A local tone mapping algorithm may include a non-linear function that changes each pixel according to features extracted from surrounding pixels. Accordingly, the marker management engine 102 may utilize a local tone mapping algorithm to modify the overexposed region corresponding to the area defined by the marker 110 such that the area is no longer overexposed. In some examples, utilizing the local tone mapping algorithm may reduce the exposure of the area by mapping previous values for the pixels within the area illustrated by the reflective surface 518 to new values (e.g., values that do not result in overexposure of the reflective surface 518). In this manner, the marker 110 becomes easier to identify since the marker 110 may be depicted at a reasonable exposure that allows for the details of the marker 110 to be visible.

In another example, the marker 110 may be placed at a location within the shadow area 506. In this example, the marker management engine 102, utilizing one or more local tone mapping algorithms, may brighten the corresponding portion of the image. In at least one example, the marker management engine 102 may incrementally brighten the shadow area 506 until it can detect at least one more object within the shadow area 506. In other examples, the marker management engine 102 may produce a set of images utilizing one or more local tone mapping algorithms, each image of the set of images individually depicting different exposures of the shadow area 506. The marker management engine 102 may then select an optimal image, or in other words, an image for which a greatest number of objects may be observed. In still further examples, the marker management engine 102 may incrementally bright the shadow area 506 until the marker 110 is detected. Upon detecting the marker 110, the marker management engine may cease executing instructions related to local tone mapping.

Figure 6:
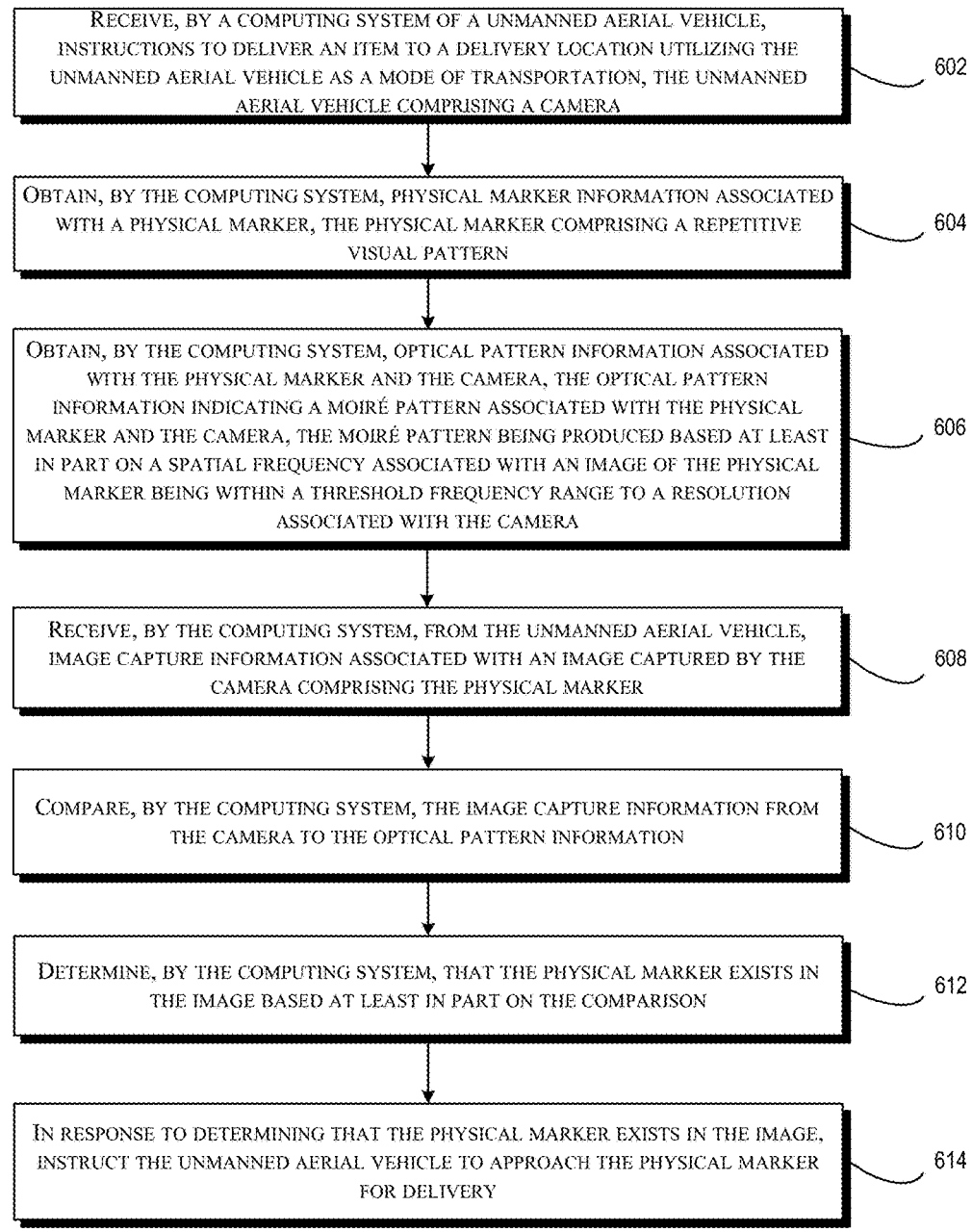
FIG. 6 illustrates a flow of an example process for detecting for utilizing the marker management engine, in accordance with at least one embodiment.

FIG. 6 illustrates a flow of an example process 600 for detecting a marker utilizing the marker management engine 102 of FIG. 1, in accordance with at least one embodiment. Although the example below illustrates a use case in which the computing system is a component of a UAV (e.g., the UAV 200 of FIG. 2), it should be appreciated that the process 600 may equally apply in situations where the functionality is being provided by a remote system (e.g., a server computer remote to the UAV 200). The process 600 may begin at block 602, where the marker management engine 102 (e.g., a computing system of the UAV 200 of FIG. 2) may receive instructions to deliver an item to a delivery location utilizing the unmanned aerial vehicle as a mode of transportation, the unmanned aerial vehicle comprising a camera. The instructions may include item identification, delivery options (e.g., UAV delivery, two-day delivery, same-day delivery, or any suitable combination of the above), delivery preferences (e.g., time of day for preferred delivery, packaging options, etc.), or the like.

At block 604, the computing system (e.g., the marker management engine 102) may obtain physical marker information associated with a physical marker (e.g., the marker 110 of FIG. 1). In some examples, the physical marker may comprise a repetitive visual pattern (e.g., vertical/horizontal lines, wavy lines, checkered pattern, etc.). In some cases, the physical marker may be a physical object that bears a marker design such as a piece of paper, a sheet of plastic, or the like. In other examples, the physical marker may include a display screen or projected image that depicts the marker design.

At block 606, the computing system (e.g., the marker management engine 102) may obtain optical pattern information associated with the physical marker and the camera. In at least one example, the optical pattern information may indicate a moiré pattern associated with the physical marker and the camera. The optical pattern information may be a pre-generated image and/or pre-generated information specifying one or attributes of a moiré pattern produced by a combination of a particular marker design and a particular camera. In at least one example, the moiré pattern is produced based at least in part on a spatial frequency associated with an image of the physical marker being within a threshold frequency range to a resolution associated with the camera.

At block 608, the computing system (e.g., the marker management engine 102) may receive, from the unmanned aerial vehicle, image capture information associated with an image captured by the camera comprising the physical marker. Image capture information, in some cases, may specify one or more details of the image (e.g., the exposure of the image, the data needed to electronically reproduce the image, etc.).

At block 610, the computing system (e.g., the marker management engine 102) may compare the image capture information from the camera to the optical pattern information.

At block 612, the computing system (e.g., the marker management engine 102) may determine that the physical marker exists in the image based at least in part on the comparison. Any suitable number and type of image recognition techniques may be employed to determine whether the physical marker exists in the image.

At block 614, in response to determining that the physical marker exists in the image, the computing system (e.g., the marker management engine 102) may instruct the unmanned aerial vehicle to approach the physical marker for delivery. For example, the marker management engine 102 may communicate information to a propulsion system of the UAV 200, or to a module responsible for controlling propulsion to cause the UAV to calculate a heading for the UAV in order to bring the UAV to the delivery location corresponding to the physical marker.

Figure 7:
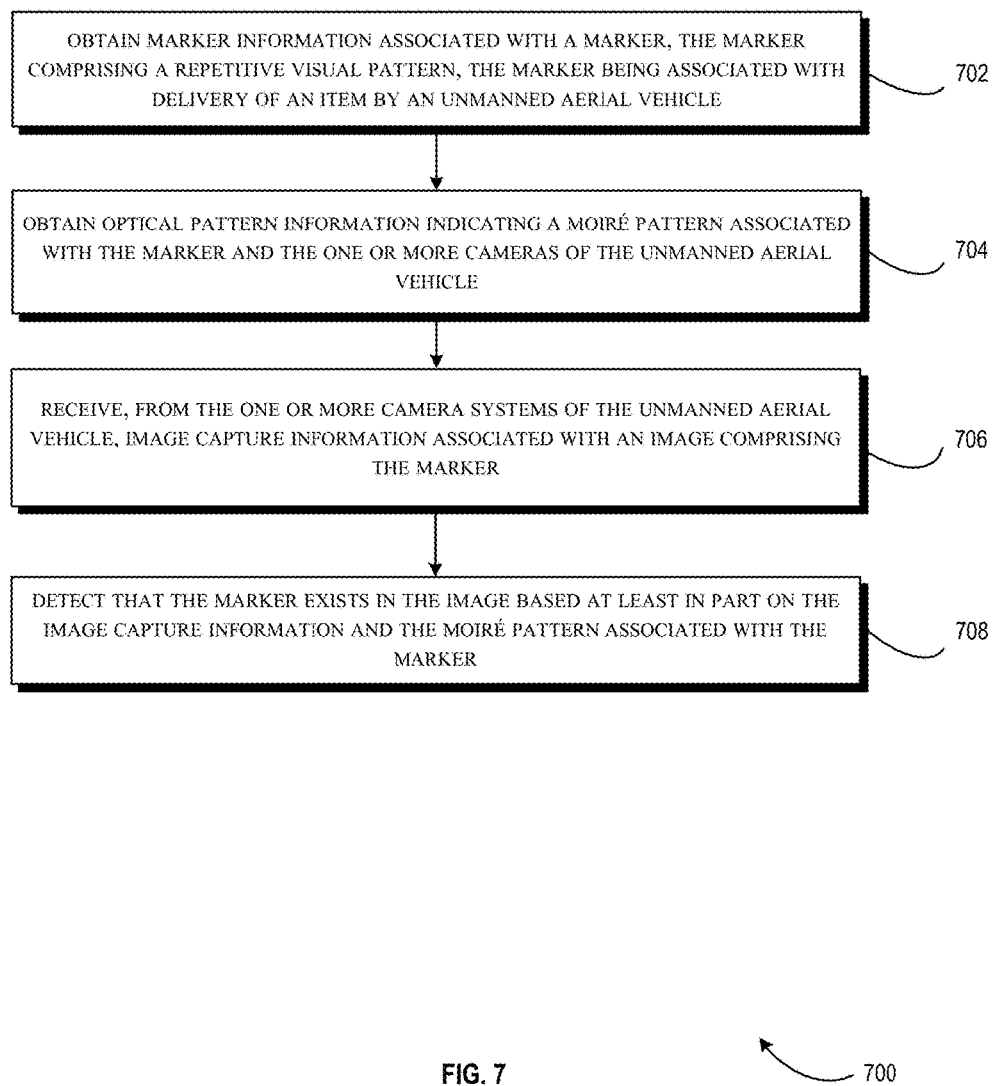
FIG. 7 illustrates a flow of an additional example process for detecting for utilizing the marker management engine, in accordance with at least one embodiment.

FIG. 7 illustrates a flow of an additional example process 700 for detecting a marker utilizing the marker management engine 102 of FIG. 1, in accordance with at least one embodiment. Although the example below illustrates a use case in which the computing system is a component of a UAV (e.g., the UAV 200 of FIG. 2), it should be appreciated that the process 600 may equally apply in situations where the functionality is being provided by a remote system (e.g., a server computer remote to the UAV 200). The process 700 may begin at block 702, where the marker management engine 102 (e.g., a computing system of the UAV 200 of FIG. 2) may obtain marker information associated with a marker, the marker comprising a repetitive visual pattern, the marker being associated with delivery of an item by an unmanned aerial vehicle.

At block 704, the computing system (e.g., the marker management engine 102) may obtain optical pattern information indicating a moiré pattern associated with the marker and the one or more cameras of the unmanned aerial vehicle.

At block 706, the computing system (e.g., the marker management engine 102) may receive, from the one or more camera systems of the unmanned aerial vehicle, image capture information associated with an image comprising the marker.

At block 708, the computing system (e.g., the marker management engine 102) may detect that the marker exists in the image based at least in part on the image capture information and the moiré pattern associated with the marker.

Figure 8:
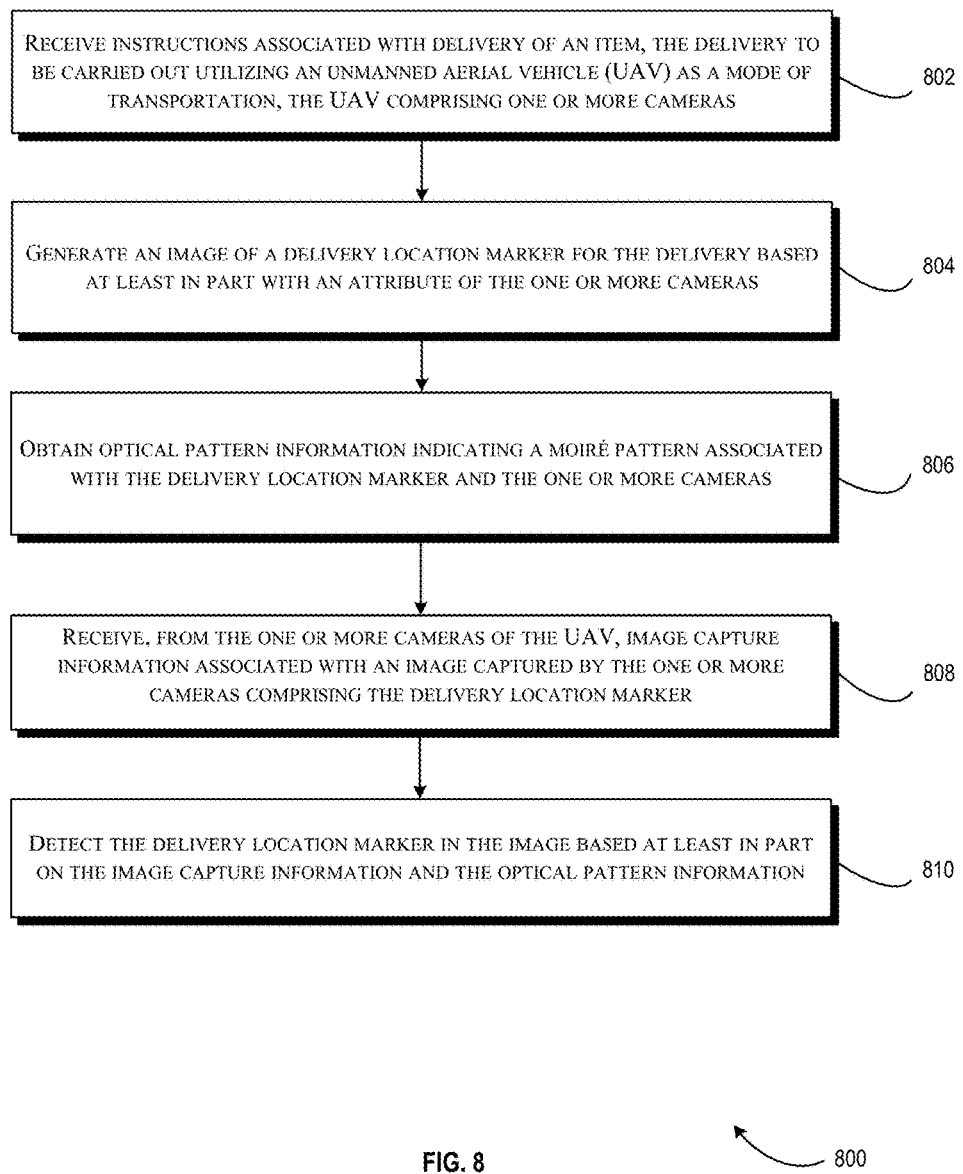
FIG. 8 illustrates a flow of still one further example process for detecting for utilizing the marker management engine, in accordance with at least one embodiment.

FIG. 8 illustrates a flow of still one further example process 800 for detecting a marker utilizing the marker management engine 102 of FIG. 1, in accordance with at least one embodiment. Although the example below illustrates a use case in which the computing system is a component of a UAV (e.g., the UAV 200 of FIG. 2), it should be appreciated that the process 600 may equally apply in situations where the functionality is being provided by a remote system (e.g., a server computer remote to the UAV 200). The process 800 may begin at block 802, where the marker management engine 102 (e.g., a computing system of the UAV 200 of FIG. 2) may receive instructions associated with delivery of an item, the delivery to be carried out utilizing an unmanned aerial vehicle (UAV) as a mode of transportation, the UAV comprising one or more cameras.

At block 804, the computing system (e.g., the marker management engine 102) may generate an image of a delivery location marker for the delivery based at least in part with an attribute of the one or more cameras.

At block 806, the computing system (e.g., the marker management engine 102) may obtain optical pattern information indicating a moiré pattern associated with the delivery location marker and the one or more cameras.

At block 808, the computing system (e.g., the marker management engine 102) may detect the delivery location marker in the image based at least in part on the image capture information and the optical pattern information.

Figure 9:
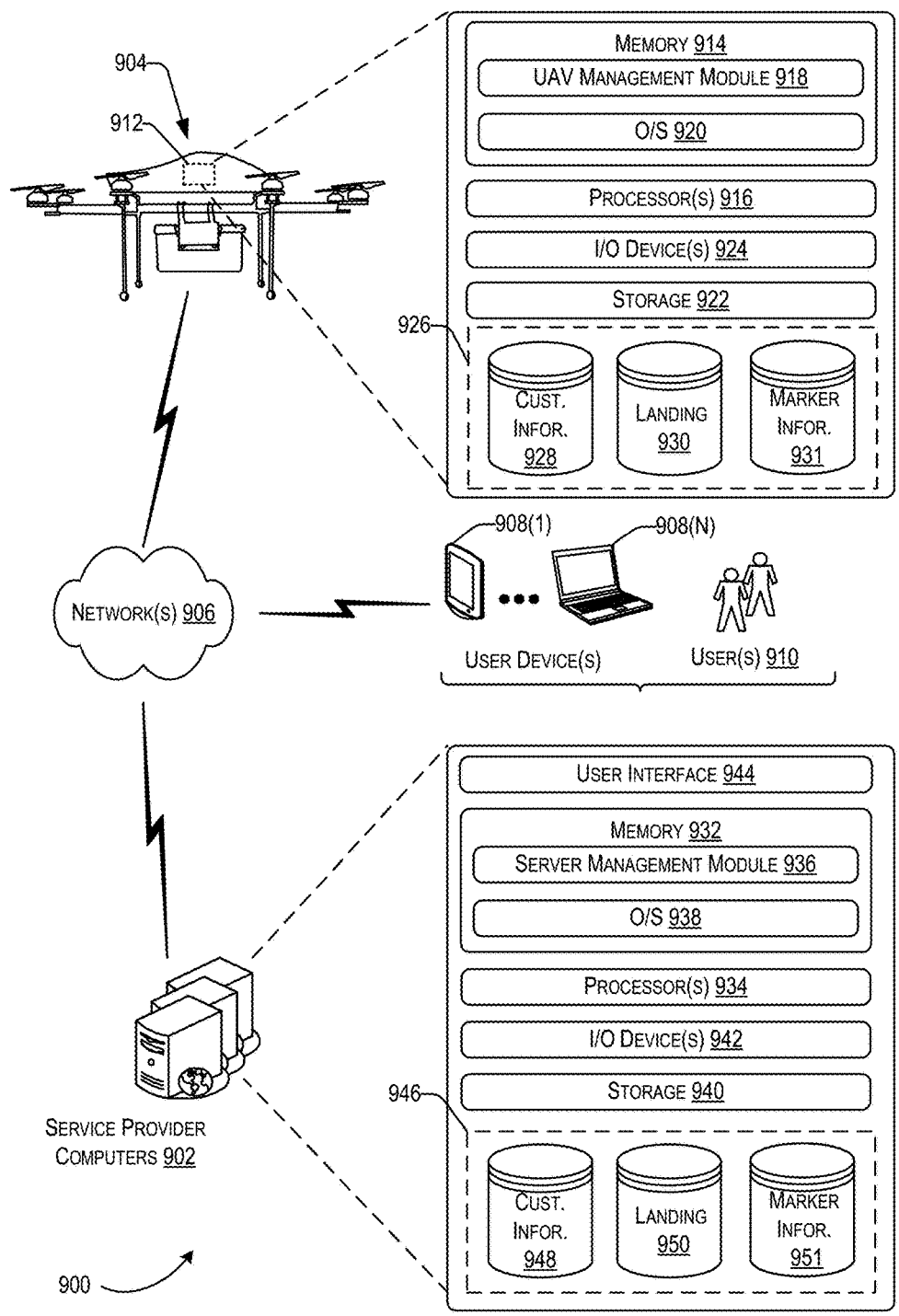
FIG. 9 illustrated an example architecture for using a UAV for item delivery and marker detection, in accordance with at least one embodiment.

FIG. 9 illustrated an example architecture 900 for using a UAV 904 (e.g., the UAV 104 of FIG. 1) for a particular mission (e.g., delivering one or more items to a location, picking up one or more items from a delivery location, etc.). FIG. 9 illustrates a package delivery mission, although other missions are likewise possible. The architecture 900 may include one or more service provider computers 902. The service provider computers 902 may support an electronic marketplace (not shown) and interface with purchase and delivery services of the electronic marketplace. In this manner, the service provider computers 902 may coordinate delivery of items via UAVs, such as UAV 904, to customers of the electronic marketplace. In some examples, the service provider computers 902 may be a stand-alone service operated on its own or in connection with an electronic marketplace. In either example, the service provider computers 902 may be in communication with the UAV 904 via one or more network(s) 906 (hereinafter, "the network 906"). The network 906 may include any one or a combination of many different types of networks, such as cable networks, the Internet, wireless networks, cellular networks, radio networks, and other private and/or public networks. Thus, the service provider computers 902 may be configured to provide back-end control of the UAV 904 prior to, during, and/or after completion of its delivery plan. In some examples, the UAV 904 may be configured to accomplish its delivery plan (e.g., detect a marker, deliver an item to a location of the marker, etc.) with little to no communication with the service provider computers 902.

User devices 908(1)-908(N) (hereinafter, "the user device 908") may also be in communication with the service provider computers 902 and the UAV 904 via the network 906. The user device 908 may be operable by one or more users 910 (hereinafter, "the users 910") to access the service provider computers 902 (or an electronic marketplace) and the UAV 904 via the network 906. The user device 908 may be any suitable device capable of communicating with the network 906. For example, the user device 908 may be any suitable computing device such as, but not limited to, a mobile phone, a smart phone, a personal digital assistant (PDA), a laptop computer, a thin-client device, a tablet PC, a desktop computer, a set-top box, or other computing device. In some examples, the user device 908 may be in communication with the service provider computers 902 via one or more web servers constituting an electronic marketplace (not shown) connected to the network 906 and associated with the service provider computers 902.

Turning now to the details of the UAV 904, the UAV 904 may include an onboard computer 912 including at least one memory 914 and one or more processing units (or processor(s)) 916. The processor(s) 916 may be implemented as appropriate in hardware, computer-executable instructions, software, firmware, or combinations thereof. Computer-executable instruction, software or firmware implementations of the processor(s) 916 may include computer-executable or machine-executable instructions written in any suitable programming language to perform the various functions described. The memory 914 may include more than one memory and may be distributed throughout the onboard computer 912. The memory 914 may store program instructions (e.g. UAV management module 918 that may implement functionalities of the marker management engine 102 of FIG. 1 and/or the management component 202 of FIG. 2) that are loadable and executable on the processor(s) 916, as well as data generated during the execution of these programs. Depending on the configuration and type of memory including the UAV management module 918, the memory 914 may be volatile (such as random access memory (RAM)) and/or non-volatile (such as read-only memory (ROM), flash memory, or other memory). The memory 914 may also include additional removable storage and/or non-removable storage including, but not limited to, magnetic storage, optical discs, and/or tape storage. The disk drives and their associated computer-readable media may provide non-volatile storage of computer-readable instructions, data structures, program modules, and other data for the computing devices. In some implementations, the memory 914 may include multiple different types of memory, such as static random access memory (SRAM), dynamic random access memory (DRAM), or ROM. Turning to the contents of the memory 914 in more detail, the memory 914 may include an operating system 920 and one or more application programs, modules or services for implementing the features disclosed herein including at least the UAV management module 918.

In some examples, the onboard computer 912 may also include additional storage 922, which may include removable storage and/or non-removable storage. The additional storage 922 may include, but is not limited to, magnetic storage, optical disks, and/or tape storage. The disk drives and their associated computer-readable media may provide non-volatile storage of computer-readable instructions, data structures, program modules, and other data for the computing devices.

The memory 914 and the additional storage 922, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the onboard computer 912. The modules of the onboard computer 912 may include one or more components. The onboard computer 912 may also include input/output (I/O) device(s) 924 and/or ports, such as for enabling connection with a keyboard, a mouse, a pen, a voice input device, a touch input device, a display, speakers, a printer, or other I/O device. The I/O device(s) 924 may enable communication with the other systems of the UAV 904 (e.g., other parts of the control system, power system, communication system, navigation system, propulsion system, and the retaining system).

The onboard computer 912 may also include data store 926. The data store 926 may include one or more databases, data structures, or the like for storing and/or retaining information associated with the UAV 904. In some examples, the data store 926 may include databases, such as customer information database 928, landing zone database 930, and or marker information database 931. Customer information database 928 may be configured to store any suitable customer information that may be used by the UAV 904 in implementing and/or affecting its delivery plan. For example, the customer information database 928 may include profile characteristics and/or order information for the user(s) 910. The profile characteristics may include a shipping address, delivery preferences, or the like. The order information may indicate one or more items that were ordered by the user(s) 910 utilizing an electronic marketplace provided by the service provider computers 902. The order information may include delivery attributes that indicate that the delivery is to be achieved utilizing a particular UAV (e.g., the UAV 904) or generally utilizing a UAV (e.g., a next available UAV). The landing zone database 930 may store suitable landing zones or drop-off zones associated with a particular user. The landing zone database 930 may include GPS coordinates and/or images of landing zones associated with a particular user. The marker information database 931 may include marker information (e.g., the stored marker information 116 of FIG. 1) that provide details regarding a particular marker that is to be utilized for delivery. In at least one embodiment, the marker information database 931 may store a set of pre-defined markers. A particular marker of the set may be selected for the order/item/delivery based on, for example, a camera associated with the delivering UAV.

Turning now to the details of the user device 908. The user device 908 may be used by the user(s) 910 for interacting with the service provider computers 902. The user device 908 may therefore include a memory, a processor, a user-interface, a web-service application, and any other suitable feature to enable communication with the features of architecture 900. The web service application may be in the form of a web browser, an application programming interface (API), virtual computing instance, or other suitable application. In some examples, when the service provider computers 902 are part of, or share an association with, an electronic marketplace, the user device 908 may be used by the user(s) 910 for procuring one or more items from the electronic marketplace. The user(s) 910 may request delivery of the purchased item(s) using the UAV 904, or the service provider computers 902 may coordinate such delivery on its own.

The service provider computers 902, perhaps arranged in a cluster of servers or as a server farm, may host web service applications. These servers may be configured to host a website (or combination of websites) viewable via the user device 908. The service provider computers 902 may include at least one memory 932 and one or more processing units (or processor(s)) 934. The processor(s) 934 may be implemented as appropriate in hardware, computer-executable instructions, software, firmware, or combinations thereof. Computer-executable instruction, software or firmware implementations of the processor(s) 934 may include computer-executable or machine-executable instructions written in any suitable programming language to perform the various functions described.

The memory 932 may include more than one memory and may be distributed throughout the service provider computers 902. The memory 932 may store program instructions (e.g., server management module 936) that are loadable and executable on the processor(s) 934, as well as data generated during the execution of these programs. Depending on the configuration and type of memory including the server management module 936, the memory 932 may be volatile (such as random access memory (RAM)) and/or non-volatile (such as read-only memory (ROM), flash memory, or other memory). The service provider computers 902 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 932 may include multiple different types of memory, such as static random access memory (SRAM), dynamic random access memory (DRAM), or ROM.

Turning to the contents of the memory 932 in more detail, the memory 932 may include an operating system 938 and one or more application programs, modules or services for implementing the features disclosed herein including at least the server management module 936. The server management module 936, in some examples, may function similarly to the UAV management module 918. For example, when the UAV 904 is in network communication with the service provider computers 902, the UAV 904 may receive at least some instructions from the service provider computers 902 as the server management module 936 is executed by the processors 934. In some examples, the UAV 904 executes the UAV management module 918 (e.g., to implement the features described with respect to the marker management engine 102 and/or the management component 202 of FIG. 2) to operate independent of the service provider computers 902.

In some examples, the service provider computers 902 may also include additional storage 940, which may include removable storage and/or non-removable storage. The additional storage 940 may include, but is not limited to, magnetic storage, optical disks, and/or tape storage. The disk drives and their associated computer-readable media may provide non-volatile storage of computer-readable instructions, data structures, program modules, and other data for the computing devices.

The memory 932 and the additional storage 940, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the service provider computers 902. The modules of the service provider computers 902 may include one or more components. The service provider computers 902 may also include input/output (I/O) device(s) 942 and/or ports, such as for enabling connection with a keyboard, a mouse, a pen, a voice input device, a touch input device, a display, speakers, a printer, or other I/O device.

In some examples, the service provider computers 902 may include a user interface 944. The user interface 944 may be utilized by an operator, or other authorized user to access portions of the service provider computers 902. In some examples, the user interface 944 may include a graphical user interface, web-based applications, programmatic interfaces such as application programming interfaces (APIs), or other user interface configurations. The service provider computers 902 may also include data store 946. The data store 946 may include one or more databases, data structures, or the like for storing and/or retaining information associated with the service provider computers 902. The data store 946 may include databases, such as customer information database 948, landing zone database 950, and marker information database 951. The customer information database 948, the landing zone database 950, and the marker information database 951 may include similar information as the customer information database 928, the landing zone database 930, and the marker information database 931 of the onboard computer 912. In some examples, the service provider computers 902 may store a larger amount of information in the data store 946 than the onboard computer 912 is capable of storing in the data store 926. Thus, in some examples, at least a portion of the information from the databases in the data store 946 is copied to the databases of the data store 926, e.g., periodically, occasionally, in connection with an event, or otherwise. In this manner, the data store 926 may have up-to-date information, without having to maintain the databases. In some examples, this information may be transferred as part of a delivery plan prior to the UAV 904 beginning a delivery mission.

In at least one embodiment, the UAV management module 918 and/or the server management module 936 (hereinafter, the "management modules") may provide the functionality of the marker management engine 102 of FIG. 1 from a UAV centric or server centric viewpoint, respectively. For example, the management modules may be configured to receive delivery information associated with an item to be delivered by UAV. The management modules may receive order information identifying the item(s) to be delivered. In some cases, the delivery information may specify a particular UAV to be utilized for delivery, while in other cases the management modules may select a particular UAV for delivery. The management modules may select a marker design from, for example, a number of pre-defined marker designs (e.g., stored in the marker information database 931 and/or the marker information database 951). In some examples, a marker may be designed to incorporate personal data associated with the user (e.g., a family portrait, the user's name, the user's address) and the marker may be modified or otherwise generated to include repetitive patterns that, when captured by a camera of the UAV 904, will result in a moiré pattern. Optical pattern information indicating a design pattern and/or moiré pattern that the selected marker will produce may be stored, for example, as an association or as part of the order information in a user profile included in the customer information database 928 or the customer information database 948. Additionally, or alternatively, the optical pattern information may be stored as an association with the marker within the marker information database 931 or the marker information database 951.

In at least one embodiment, the management modules may execute instructions to cause marker information (e.g., a marker design) to be sent electronically to the user who requested delivery of the item. In some cases, the user may print the marker on a piece of paper or utilize an electronic device to (e.g., LED screen, LCD screen, projector, etc.) to otherwise display the marker. In some cases, the management modules may execute instructions that cause a physical marker to be created on, for example, a sheet of plastic. The physical marker may then be shipped to the user.

At a suitable point in time, the UAV 904 may receive instructions specifying a delivery time and a delivery location for a requested item. The item may be loaded onto the UAV 904 and the UAV may execute instructions to navigate to an area relatively near the requested delivery location. At a suitable distance (e.g., 1 mile, 2 miles, 1000 feet, etc.) within the delivery location, the management modules may execute instructions that cause a camera system (e.g., the camera system 203 of FIG. 3, a component of the onboard computer 912) of the UAV to begin capturing one or more images of the area (e.g., an aerial view of the ground from the location of the UAV).

Upon receiving the one or more images of the area, the management modules may analyze the images utilizing any combination of the techniques described herein in order to ascertain whether or not the marker associated with, for example, the delivery location is visible. For example, the management modules may analyze the image(s) to determine whether or not a moiré pattern is visible in the image(s). If a moiré pattern exists in the image(s), the management modules may compare the image(s) and/or moiré pattern to stored marker information (e.g., stored in the marker information database 931 and/or the marker information database 951). If the moiré pattern in the captured image(s) matched (e.g., above some confidence threshold value), to the stored marker information, then the management modules may execute instructions that instruct the UAV 904 to navigate to the delivery location indicated by the detected marker. If a moiré pattern is not detected, or the moiré pattern detected does not match the stored marker information, the management modules may execute instructions that cause the UAV to continue a search pattern or to execute a new search pattern in order to enable the UAV to continue searching for the marker in the area or in another area.

In at least one embodiment, the management modules may analyze images utilizing the marker filter images discussed in FIGS. 3A, 3B, 4A and/or 4B. For example, the management modules may execute instructions to cause one or more marker filter images to be superimposed over the captured image. The management modules may analyze the resulting image to determine whether a moiré pattern is produced that matches stored marker information. For example, a marker may be generated that by itself does not create any sort of recognizable features. However, a marker filter image (e.g., vertical lines) may be utilized that, when superimposed over the marker and moved (e.g., according to the motion of the UAV) may produce an animation (e.g., a rider on horseback, a moving sequence of arrows, a "blinking" target, or the like). The management modules, upon determining that the animation matches the stored marker information, may execute instructions to cause the UAV to navigate toward the detected marker.

In at least one embodiment, the management modules may analyze an image utilizing any combination of the local tone mapping techniques discussed herein. For example, the management modules may identify one or more overexposed and/or underexposed portions of an image/video. The management modules may, upon detection of overexposure and/or underexposure may enable multiple cameras of the UAV 904 to capture an image, each camera utilizing different exposure settings. Alternatively, the management modules may initially instruct multiple cameras to capture images at different exposures prior to any determination that an underexposed and/or overexposed portion of an image exists. The management modules may determine, in some cases, a particular portion of a particular image that comprises the best exposure for the portion of the image from the set of images captured by the various UAV cameras. For example, the management modules may be configured to produce a histogram identifying portions of overexposure and/or underexposure within the image. In some cases, the management modules may replace overexposed/underexposed portions of an image with a portion of another image that includes a best exposure for that portion. In at least one example, the management modules may combine various best exposed portions of a variety of images in order to produce an optimal image. Once an optimal combination of portions of images are assembled, the management modules may analyze the image to detect a marker. If a marker is detected, and if the marker matches the stored marker information for the delivery location, for example, then the management modules may execute instructions to cause the UAV to navigate toward the marker and to complete its mission by delivering the item. The same methodology may be utilized in missions in which the UAV is picking up the item from the delivery location.

In at least one embodiment, the management modules may selectively brighten/darken portions of the captured images that are deemed to be too dark (e.g., within a threshold measure of darkness) or too light (e.g., within a threshold measure of lightness). For example, the management modules may be configured to produce a histogram identifying portions of overexposure and/or underexposure. Accordingly, the management modules may utilize a local tone mapping algorithm to adjust the pixels within the identified regions to a pixel value that is commensurate with the pixel values within a range (e.g., within 10 pixels, 5 pixels, etc.) of the pixel being adjusted.

Figure 10:
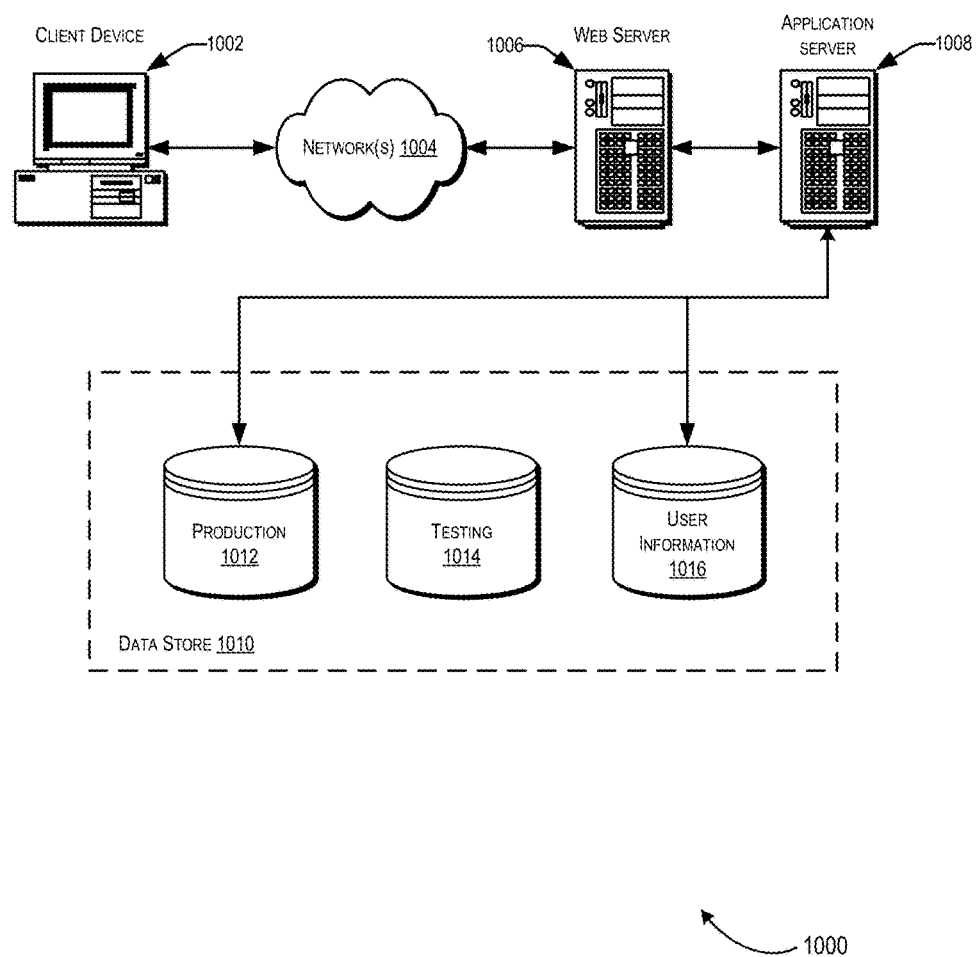
FIG. 10 is a schematic diagram illustrating an example environment for implementing aspects in accordance with at least one embodiment described herein.

FIG. 10 illustrates aspects of an example system 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the electronic client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the electronic client device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a computing system of an unmanned aerial vehicle, instructions to deliver an item to a delivery location utilizing the unmanned aerial vehicle as a mode of transportation, the unmanned aerial vehicle comprising a camera;
   obtaining, by the computing system, physical marker information associated with a physical marker, the physical marker comprising a repetitive visual pattern;
   obtaining, by the computing system, optical pattern information associated with the physical marker and the camera, the optical pattern information indicating a moiré pattern associated with the physical marker and the camera, the moiré pattern being produced based at least in part on a spatial frequency associated with an image of the physical marker being within a threshold frequency range to a resolution associated with the camera;
   receiving, by the computing system, from the unmanned aerial vehicle, image capture information associated with a captured image captured by the camera, the captured image comprising the physical marker;
   comparing, by the computing system, the image capture information from the camera to the optical pattern information;
   determining, by the computing system, that the physical marker exists in the image based at least in part on the comparison; and
   in response to determining that the physical marker exists in the image, instructing the unmanned aerial vehicle to approach the physical marker for delivery.

2. The computer-implemented method of claim 1, wherein the delivery location is associated with a user of an electronic marketplace, an order of the electronic marketplace, or a particular item of the electronic marketplace.

3. The computer-implemented method of claim 1, wherein the physical marker is displayed by a light-emitting diode (LED) screen, a liquid crystal display (LCD), or a projector.

4. The computer-implemented method of claim 1, further comprising adjusting an exposure of a portion of the image captured by the camera comprising the physical marker, wherein determining that the physical marker exists in the image is further based at least in part on the exposure of the portion of the image as adjusted.

5. A system, comprising:
   a memory configured to store computer-executable instructions;
   one or more cameras configured to capture one or more images; and
   a processor configured to access the memory and execute the computer-executable instructions to at least:
      obtain marker information associated with a marker, the marker comprising a repetitive visual pattern, the marker being associated with delivery of an item by an unmanned aerial vehicle;
      obtain optical pattern information indicating a moiré pattern associated with the marker and one or more cameras systems of the unmanned aerial vehicle, the moiré pattern being produced based at least in part on a spatial frequency associated with an image of the marker being within a threshold frequency range to a resolution associated with at least one of the one or more cameras;

receive, from the one or more camera systems of the unmanned aerial vehicle, image capture information associated with a captured image comprising the marker; and detect that the marker exists in the captured image based at least in part on the image capture information and the moiré pattern associated with the marker.

6. The system of claim 5, wherein the marker is unique to the delivery of the item.

7. The system of claim 5, the processor being further configured to execute the computer-executable instructions to at least:

identify the marker from a plurality of pre-defined markers; and provide the marker information associated with the marker to a user device.

8. The system of claim 5, the processor being further configured to execute the computer-executable instructions to at least:

receive order information associated with the delivery; and identify the unmanned aerial vehicle as a mode of transportation based at least in part on the order information.

9. The system of claim 8, wherein detecting that the marker exists in the captured image utilizes a portion of the captured image.

10. The system of claim 5, wherein the image capture information comprises the moiré pattern and the moiré pattern is produced based at least in part on repetitive details of the marker and the resolution of the one or more cameras.

11. The system of claim 5, the processor being further configured to execute the computer-executable instructions to at least:

obtain a secondary image from a plurality of images; and superimpose the secondary image over the captured image, wherein the marker is detected in the captured image further based at least in part on the secondary image.

12. The system of claim 11, wherein the moiré pattern comprises one of a line moiré pattern, a shape moiré pattern, or a moiré animation.

13. The system of claim 12, wherein the moiré pattern enables the marker to be detected from a greater distance than detection could otherwise occur utilizing image capture alone.

14. A non-transitory computer-readable medium having stored thereon computer-executable instructions that, when executed by at least one processor, configure at least one computer to perform instructions comprising:

receiving instructions associated with delivery of an item, the delivery to be carried out utilizing an unmanned aerial vehicle as a mode of transportation, the unmanned aerial vehicle comprising one or more cameras;

generating an image of a delivery location marker for the delivery based at least in part with an attribute of the one or more cameras;

obtaining optical pattern information indicating a moiré pattern associated with the delivery location marker and the one or more cameras, the moiré pattern being produced based at least in part on a spatial frequency associated with an image of the delivery location marker being within a threshold frequency range to a resolution associated with at least one of the one or more cameras;

receiving, from the one or more cameras of the unmanned aerial vehicle, image capture information associated with a captured image captured by the one or more cameras comprising the delivery location marker; and detecting the delivery location marker in the captured image based at least in part on the image capture information and the optical pattern information.

15. The non-transitory computer-readable medium of claim 14, wherein the captured image is one of a plurality of images captured by the one or more cameras.

16. The non-transitory computer-readable medium of claim 14, wherein the moiré pattern alters a contrast of an area of the captured image, and wherein altering the contrast enables the delivery location marker to be detected more frequently than if the contrast remained unaltered.

17. The non-transitory computer-readable medium of claim 14, wherein the at least one computer is configured to perform further instructions comprising:

associating the image of the delivery location marker with a user of an electronic marketplace; and storing the image of the delivery location marker.

18. The non-transitory computer-readable medium of claim 14, wherein a replication of the delivery location marker is placed at a delivery location to enable the delivery location to be detected utilizing the one or more cameras.

19. The non-transitory computer-readable medium of claim 14, wherein the at least one computer is configured to perform further instructions comprising, causing the unmanned aerial vehicle to navigate to a location of the delivery location marker in response to the delivery location marker being detected in the captured image.

20. The non-transitory computer-readable medium of claim 14, wherein detecting the delivery location marker in the image configures the at least one computer to perform further instructions comprising:

comparing the image capture information to the optical pattern information; and determining that the image capture information matches the optical pattern information within a threshold confidence amount.

* * * * *